United States Patent [11] 3,627,628

[72] Inventor Ronald H. Dahms
 Springfield, Mass.
[21] Appl. No. 738,793
[22] Filed June 21, 1968
[45] Patented Dec. 14, 1971
[73] Assignee Monsanto Company
 St. Louis, Mo.

[54] COLD PUNCHABLE LAMINATES
 2 Claims, No Drawings
[52] U.S. Cl. ................................................ 161/251,
 156/308, 156/322, 156/331, 156/334, 156/335,
 161/252, 161/253, 161/248, 161/254, 161/255,
 161/256, 161/264, 260/80.8, 260/82.3, 260/88.7,
 260/89.5, 260/846
[51] Int. Cl. .................................................... B32b 27/10,
 B32b 27/30, C09j
[50] Field of Search ........................................ 161/250,
 251, 252, 253, 254, 255, 256, 257, 259, 264, 248;
 156/308, 315, 322, 331, 334, 335; 260/80.8, 82.3,
 88.7, 89.5, 846

[56] References Cited
UNITED STATES PATENTS

| | | | |
|---|---|---|---|
| 2,689,228 | 9/1954 | Thomas .......................... | 161/250 X |
| 2,833,684 | 5/1958 | Horowitz ....................... | 161/251 X |
| 2,890,148 | 6/1959 | Dede ............................. | 161/251 X |
| 2,902,458 | 9/1959 | Teppema ....................... | 161/250 X |
| 3,331,730 | 7/1967 | Bean et al. ..................... | 161/257 X |
| 3,484,338 | 12/1969 | Britlon et al. .................. | 161/251 X |

Primary Examiner—John T. Goolkasian
Assistant Examiner—C. B. Cosby
Attorneys—John W. Klooster, Arthur E. Hoffman and H. B. Roberts ABSTRACT: Industrial cellulosic laminates which can be cold punched without appreciably cracking or shattering. The laminates are prepared from papers impregnated with a mixture of a carboxylated alkadiene interpolymer and a low molecular weight phenol-formaldehyde resin.

COLD PUNCHABLE LAMINATES

BACKGROUND

In the art of making laminates of cellulosic substrates, it has long been appreciated that phenol-aldehyde resins tend to produce laminates of cellulosic materials which have relatively poor cold punchability characteristics, that is to say, the resulting laminates crack and split and otherwise deteriorate in the region where an impact force is used to cut or punch or otherwise penetrate the surface of the resulting laminate construction.

Heretofore, attempts have been made to use plasticizers in combination with phenol-aldehyde resins to improve cold punchability characteristics in laminates, but the results have suffered from a number of disadvantages. For example, even though cold punchability was achieved, the resulting laminates frequently had undesirably high water absorption and undesirably low flexural strength.

It has now been discovered that a certain combination of phenol-aldehyde resole resin and carboxylated alkadiene interpolymer can be used to produce laminates incorporating cellulosic substrates in sheetlike form which not only have desirable water absorption and flexural strength characteristics, but which also have excellent cold punchability characteristics. This combination of normally thermoplastic interpolymer and thermosettable resin is typically in the form of an aqueous system in which the resole resin portion is dissolved while the carboxylated alkadiene interpolymer portion is suspended in the form of a latex. The combination is unusual because it is water dilutable or organic liquid dilutable. The combination is also unusual because it can be applied to a cellulosic substrate in a prelamination impregnation step in a single pass operation thereby avoiding a two-step impregnation sequence.

By controllably advancing this combination when impregnated into cellulosic sheets to a predetermined extent before such are laid up together to produce a laminate under heat and pressure, one obtains the desired cold punchable product laminates.

As those skilled in the art appreciate, cold punchable laminates have use in a variety of applications, for example, in household appliance and terminal boards, structural parts, electrical switches, instrument panels, insulating washers, switch parts, jack spaces and so forth.

SUMMARY

This invention is directed to substantially nonporous cold punchable laminate constructions having low water absorption and high flexural strength characteristics. Such laminate constructions employ a plurality of cellulosic sheet members arranged face to face in a layered sequence. The sheet members are each impregnated with a homogeneous liquid composition of phenol-aldehyde resole resin and carboxylated alkadiene interpolymer and this same mixture is used as the adhesive which binds together the individual sheet members into the desired laminate configuration. A resulting laminate construction is substantially nonporous (as measured, for example, using a so-called Gurley air-permeable viscosity measurement of 15 seconds using a 5-ounce cylinder and a ¼-inch orifice). The invention is further directed to methods for making such cold punchable laminate constructions from cellulosic substrate members impregnated with a composition of phenol-aldehyde resole resin and carboxylated alkadiene interpolymer.

The liquid composition of phenol-aldehyde resole resin and carboxylated alkadiene interpolymer used for impregnating cellulosic substrates in accordance with the teachings of this invention comprises at the time of use for this invention from about 5 to 70 weight percent total combined weight of the combination of resin and interpolymer with the balance up to 100 weight percent of any given such composition being a combination of water and an organic liquid. The resin is dissolved in the liquid while the carboxylated alkadiene interpolymer is suspended in the aqueous phase as a latex (e.g. a colloidal suspension of polymer particles).

On a 100 percent solids basis, the combination of phenol-formaldehyde resin comprises from about 35 to 75 weight percent of phenol-formaldehyde resin and, correspondingly, from about 25 to 65 weight percent of the carboxylated alkadiene interpolymer, there being approximately 100 parts by weight total solids basis of combined weight in any given composition. The liquid portion of the composition comprises at least about 5 weight percent water (total liquid basis) with the balance up to 100 weight percent of any given such liquid optionally having at least one water-miscible organic liquid. Preferably, the liquid portion is 100 percent water (total liquid basis). Examples of preferred organic liquids includes lower alkanols and lower alkanones. The term "lower" as used herein has reference to molecules containing less than about 50 carbon atom per molecule. Any inert (as respects resin and interpolymer) water miscible (partially or fully) organic liquid can be employed.

The phenol-aldehyde resole resin used in the present invention is conveniently separately prepared and has a phenol to formaldehyde mol ratio of from about 0.9 to 2.5 and is produced by reacting under aqueous liquid phase conditions phenol with formaldehyde preferably in the present of a basic catalyst (preferably organic) to produce a solution containing phenol-formaldehyde resinous condensation product. Such resins having a low molecular weight are preferred, especially those which can be prepared in the form of at least a 55 weight percent aqueous solution. Such a resin solution characteristically has a water dilutability of at least about 1:1, and preferably of at least 8:1. In addition, this resin has a free formaldehyde content which is less than about 5 weight percent. Preferably, the phenol-formaldehyde mol ratio in this resin ranges from about 1½ to 2. An organic basic catalyst is preferably used in preparation as indicated so as to produce a resole resin product which will not contain free ions which might conduct an electrical charge after the resin has been thermoset. Suitable organic basic catalysts are well known to the art; examples include triethylamine, hexamethylenetetramine, and the like. Such resins are well known to those skilled in the art.

The carboxylated alkadiene interpolymer used in the preparation of the laminate constructions of this invention is one which is conveniently separately prepared in the form of a latex in water. Suitable carboxylated alkadiene interpolymers are prepared by polymerizing a monomer mixture comprising from about 3 to 8 weight percent of acrylic acid, from about 35 to 60 weight percent of a conjugated alkadiene monomer, and the balance up to 100 weight percent of any given such monomer mixture comprising at least one material selected from the group consisting of monovinyl aromatic compounds and alkene nitrile compounds. A minor amount of a surfactant is added to the monomer mixture before polymerization. These latices and methods for their preparation are described in the literature; see, for example, Bovey et al. in "Emulsion Polymerization," published by Interscience Publishers, Inc. 1955 and Schildknecht in "Polymer Processes" published by Interscience Publishers, Inc. 1956. Optionally, such an emulsion may have chemically incorporated thereinto through polymerization a small quantity, say, less than about 2 weight percent based on total interpolymer weight of a divinyl aromatic compound such as divinyl benzene, or the like.

Suitable monovinyl aromatic compounds include styrene (preferred); alkyl-substituted styrenes, such as ortho-, meta-, and paramethyl styrenes, 2,4-dimethyl styrene, paraethyl-styrene, or alpha-methyl styrene; halogen substituted styrenes such as ortho-, meta-, and parachlorostyrenes, or bromo-styrenes, 2,4-dichlorostyrene; and mixed halogen plus alkyl-substituted styrenes, such as 2-methyl-4-chlorostyrene; vinyl naphthalene; vinyl anthracene; mixtures thereof, and the like. The alkyl substituents generally have less than five carbon atoms, and may include isopropyl and isobutyl groups.

Suitable alkene nitrile compounds include acrylonitrile (preferred), methacrylonitrile, ethacrylonitrile, mixtures thereof, and the like.

Suitable conjugated alkadiene monomers include butadiene, 3-methyl-1,3-butadiene, 2-methyl-1, 3 butadiene, piperylene, chloroprene, mixtures thereof and the like. Conjugated 1,3 dienes are preferred.

Such a latex suitable for use in making a composition for employment in the present invention can contain typically as made from about 30 to 70 parts by weight of total carboxylated alkadiene interpolymer with the balance up to 100 weight percent being substantially water. Preferably, such a latex contains from about 45 to 60 parts by weight of such interpolymer.

To prepare a composition of phenol-aldehyde resin and carboxylated alkadiene interpolymer, one simply admixes the respective materials together. As initially prepared, the resulting composition typically has a total solids content (combined weight of carboxylated alkadiene interpolymer and phenol-formaldehyde resole resin) ranging from about 40 to 70 weight percent. Conveniently, as prepared, the liquid phase of the resulting mixture is substantially entirely water.

However, before such mixture is used for impregnation of paper, it is convenient to dilute the same with a water miscible organic liquid so that the total solids concentration typically ranges from about 20 to 60 weight percent, with solids contents of about 30 to 50 percent being preferred. A primary reason for adding such an organic liquid to the aqueous mixture is to permit one to impregnate paper without causing a deterioration in the wet strength of a cellulosic material such as paper which would occur before the evaporation of the water can be effectuated. By adding in with the water an organic solvent, the wet strength of a preformed cellulosic material after impregnation and before drying to remove volatile liquid is maintained at acceptable processing levels for subsequent drying, advancing, etc. by machines, etc. of the resulting impregnated sheet before or during the process of making a laminate construction of the invention.

It will be appreciated that when such an aqueous mixture is used to impregnate fibers not yet formed into a nonwoven sheet of cellulosic material (woven or nonwoven) that the mixture may not necessarily contain any organic liquid.

In general, an individual cellulosic substrate used in the laminates of the present invention is an integral performed sheetlike member composed substantially of cellulose fibers in a woven, nonwoven, or mixed structure. Typical thicknesses range from about 3 to 30 mils (under about 10 being preferred). Such members are well known to the art and include paper and cloth broadly; they need have no special characteristics. The cellulosic fibers used in such a substrate member can be of natural or synthetic origin and the sheet member can be in a woven or nonwoven state. Typical well-known sources for cellulose fibers include wood, cotton, and the like. Typically, average cellulosic fibers used in substrates employed in this invention have length to width ratios of at least about 2:1, and preferably about 6:1, with maximum length to width ratios being variable.

The term "substantially" as used herein in reference to cellulose fibers has reference to the fact that a substrate comprises mainly cellulose fibers with not more than about 5 to 10 percent of any given cellulosic substrate being other components, such as nonfibrous fillers, diluents, and the like, or fibrous noncellulosic materials, such as those derived from organic sources (e.g. protein, synthetic organic polymeric fibers like polyesters, etc.) or inorganic sources (e.g. silicious fibers or metallic fibers). Such other components when and if present, characteristically have size ranges which are not greater in magnitude than the cellulosic fibers. Preferably such other components are under 1 weight percent of the total weight of a starting individual cellulosic substrate member.

Particularly when high electrical properties are desired in a product laminate of the invention, the cellulosic substrate member should have a low ash content. Ash contents under 1 weight percent (based on total cellulosic substrate member weight) are preferred, and those having ash contents under 0.5 weight percent are preferred.

Typically, such sheet members contain impregnated thereinto from about 40 to 60 weight percent of such a composition of phenol-aldehyde resin and carboxylated alkadiene interpolymer (dry weight basis and based on 100 weight percent of the substrate member). The so-impregnated substrate members generally have thicknesses of less than about 10 mils but thicknesses up to 25 mils or even greater can be employed without departing from the spirit and scope of the present invention. In general, a preferred range of thicknesses for such members is from about 4 to 10 mils.

Preferably, the intermediate substrate sheet members can be made from a composition of phenol-aldehyde resin and carboxylated alkadiene interpolymer by impregnating a preformed cellulosic sheet member with such composition using any conventional means including spraying, coating, dipping, or the like, after which it is convenient to dry the so-treated sheet to residual volatile content to less than about 15 weight percent, preferably less than about 10 weight percent to leave an impregnated product having a desired volatile content.

When impregnating a preformed cellulosic sheet member with a phenol-aldehyde resin/carboxylated alkadiene interpolymer composition, it is convenient to use a composition which is not 100 percent water as respects its liquid portion because, as those skilled in the art appreciate, water tends to injure the wet strength of the preformed sheet member. Conventionally, therefore, the art tends to mix with the carboxylated alkadiene interpolymer and phenol-aldehyde resin mixture not only water (as indicated above) but also a water miscible organic liquid because such a liquid of water and inorganic liquid tends to maintain a high wet strength with paper impregnated with such a composition.

In general, the cellulosic substrate sheet members so-impregnated with the composition of phenol-aldehyde resin and carboxylated alkadiene interpolymer are advanced by heating in air at a temperature of from about 30° to 150° C. until the individual impregnated cellulosic substrate members have a flow in the range of from about 3 to 20 weight percent.

For the purpose of this invention, flow of an impregnated cellulosic sheet member is determined by pressing 2-inch inch discs (six ply) for 5 minutes at 150° C. and 1000 p.s.i. and calculating the weight percent of resin exuded from the discs.

Thereafter, the resulting so-advanced impregnated cellulosic sheetlike members are stacked or arranged into a desired layered sequence. As those skilled in the art will appreciate, an individual laminate construction of the invention can comprise a series of different impregnated cellulosic substrate members or a series of similar such members depending upon properties desired in the product laminate. Preferably, all laminate layers contain the resin mixture of the invention.

Following such an arranging of individual sheet member into a deck or layered sequence, the deck or layered sequence is compressed to pressures in the range of from about 50 to 2000 p.s.i. and heated simultaneously to temperatures from about 120°–180° C. for a total time interval sufficient to substantially completely thermoset the composition or phenol-aldehyde resole resin and carboxylated alkadiene interpolymer. The product is in the form of a substantially nonporous-shaped article of manufacture which comprises at least two such above described impregnated cellulosic substrate sheet members. The product laminates are cold punchable, as conveniently measured by ASTM test procedure No. D617.

EMBODIMENTS

The following examples are set forth to illustrate more clearly the principles and practices of this invention to one skilled in the art, and they are not intended to be restrictive but merely to be illustrative of the invention herein contained. Unless otherwise stated herein, all parts and percentages are on a weight basis.

Examples of low molecular weight phenol-aldehyde resole resins having characteristics as described above and suitable for use in this invention are as follows:

EXAMPLE A

Phenol (100 parts) 50 percent formalin (111 parts), and triethylamine (five parts) are charged to a vessel. The resulting mixture is reacted at about 70° C. until the free formaldehyde content is less than about 4 percent, after which the mixture is cooled. The product is a low molecular weight water soluble phenol-formaldehyde resole resin.

EXAMPLE B

Phenol (100 parts), 50 percent formalin (80 parts), and triethylamine (five parts) are charged to a vessel. The resulting mixture is reacted at about 70° C. until the free formaldehyde content is less than about 4 percent, after which the mixture is cooled. The product is a low molecular weight water soluble phenol-formaldehyde resole resin.

EXAMPLE C

Phenol (100 parts), 50 percent formalin (128 parts) and triethylamine (five parts) are charged to a vessel. The resulting mixture is reacted at about 70° C. until the free formaldehyde content is less than about 4 percent, after which the mixture is cooled. The product is a low molecular weight water soluble phenol-formaldehyde resole resin.

Examples of carboxylated alkadiene interpolymer suitable for use in this invention are:

EXAMPLE D

A commercially available latex comprising an interpolymer of styrene, butadiene and about 4-6 weight percent acrylic acid and having 48 percent by weight of solids colloidally dispersed in an aqueous medium known as Dow 636 latex.

EXAMPLE E

A pressure vessel is charged with water (140 parts), styrene (45 parts), butadiene (50 parts), acrylic acid (five parts), Triton X-770 (two parts), Triton X-100 (one part), sodium bisulfate (0.10 part) and potassim persulfate (0.25 part). The persulfate and bisulfate are added incrementally during the reaction. After heating 50° C. for 30 hours, the latex is vacuum stripped to 50 percent solids. The product is a styrene/butadiene/acrylic acid interpolymer.

EXAMPLE F

A pressure vessel is charged with water (140 parts), acrylonitrile (25 parts), butadiene (70 parts), acrylic acid (five parts), Nekal BX (three parts), sodium pyrophosphate (0.3 part), sodium bisulfite (0.1 part) and potassium persulfate (0.25 part). The persulfate and bisulfite are added incrementally during the reaction. After heating at 50° C. for 22 hours, the latex is vacuum stripped to 50 percent solids. The product is an acrylonitrile/butadiene/acrylic acid interpolymer.

Examples of impregnating compositions of resole resin and carboxylated alkadiene interpolymer suitable for use in this invention are:

EXAMPLE G-P

To prepare the impregnating compositions of this invention, a specific resole resin and a specific interpolymer are simply mixed together with stirring. Table I below gives examples of these compositions prepared from examples A-F.

TABLE I

| | Resole | | Carboxylated alkadiene interpolymer | |
|---|---|---|---|---|
| | Example No. | Amount | Example No. | Amount |
| Testing composition: | | | | |
| G | A | 65 | D | 35 |
| H | A | 50 | D | 50 |
| I | A | 65 | E | 35 |
| J | A | 65 | F | 35 |
| K | B | 65 | D | 35 |
| L | B | 65 | E | 35 |
| M | B | 65 | F | 35 |
| N | C | 65 | D | 35 |
| O | C | 65 | E | 35 |
| P | C | 65 | F | 35 |

The above compositions are diluted to 50 percent total solids using methanol.

Examples of laminate constructions of this invention made using treating compositions G through P above are prepared as follows:

EXAMPLES 1-15

Examples of preformed cellulosic substrate types are chosen as follows:

Type 1  Nonwoven linters paper about 10 mils in thickness,

Type 2  Nonwoven unbleached Kraft paper about 7 mils in thickness,

Type 3  Nonwoven alpha-cellulose paper about 10 mils in thickness,

Type 4  Nonwoven bleached Kraft paper about 15 mils in thickness,

Type 5  Woven cotton duck cloth about 8 ounces weight,

Type 6  Woven linen cloth about 4 ounces weight.

All types have an ash content less than about 0.9 weight percent.

The impregnation procedure for impregnating each above substrate type is as follows:

Cellulosic sheets are passed through the impregnating solution (example G), drawn between squeeze rolls to remove excess resin and hung in an oven at 135° C. for drying. A resin content of 50 percent is thus obtained in each sample sheet so treated or otherwise as shown in table II below:

Laminates are made from these impregnating sheets by stacking together these sheets in the form of eight-ply green laminates. Each green laminate is then cured using a pressure of 1500 p.s.i., a temperature of from about 140° C. and a time of about 15 minutes. The resulting laminates are cold punchable without deleterious cracking when cold punched at 25° C. according to ASTM D-617. The results are shown in table II below:

TABLE II

| | Treating composition | Cellulosic type | Laminate resin content, weight percent | Laminate Punching |
|---|---|---|---|---|
| Example: | | | | |
| 1 | G | 1 | 50 | No cracks. |
| 2 | G | 2 | 48 | Do. |
| 3 | G | 3 | 52 | Do. |
| 4 | G | 4 | 48 | Do. |
| 5 | J | 2 | 51 | Do. |
| 6 | K | 2 | 48 | Do. |
| 7 | N | 2 | 47 | Do. |
| 8 | G | 5 | 45 | Do. |
| 9 | G | 6 | 48 | Do. |
| 10 | H | 1 | 52 | Do. |
| 11 | I | 1 | 47 | Do. |
| 12 | L | 1 | 49 | Do. |
| 13 | M | 1 | 48 | Do. |
| 14 | O | 1 | 51 | Do. |
| 15 | P | 1 | 50 | Do. |

What is claimed is:

1. A cold punchable substantially nonporous laminate construction having low water absorption and high flexural strength comprising an integral combination of at least two cellulosic substrate sheet members arranged face-to-face in a layer sequence, each sheet member being impregnated with, and adhered to the adjoining layer by a thermoset composition comprising a phenol-aldehyde resole resin and a carboxylated alkadiene interpolymer comprising a polymerized monomer mixture of from about 3 to 8 weight percent acrylic acid, from about 35 to 60 weight percent of a conjugated alkadiene monomer, and the balance up to 100 weight percent comprising at least one material selected from the group consisting of monovinyl aromatic compounds and alkene nitrile compounds, said laminate construction having been prepared by the steps of:

A. heating cellulosic substrate sheet members each impregnated with a composition comprising phenol-aldehyde resole resin and carboxylated alkadiene interpolymer such that said individual cellulosic sheet members contain from about 30 to 70 weight percent of said composition for each 100 parts by weight of said cellulosic sheet member, said heating being conducted at a temperature of from about 30° to 180° C. for a time sufficient to advance said composition to an extent such that each such sheet member has a flow of from about 3 to 20 percent, B. arranging the resulting so-advanced cellulosic sheet member into a desired layered sequence, and C. compressing the resulting sequence while maintaining pressures in the range of from about 50 to 200 p.s.i. while maintaining a temperature of from about 120° to 180° C. for a time sufficient to substantially completely thermoset said composition and thereby produce a desired laminate construction.

2. In a process for making a cold punchable substantially nonporous laminate construction using cellulosic substrate sheet members impregnated with from about 30 to 70 weight percent of a composition comprising phenol-aldehyde resole resin and carboxylated alkadiene interpolymer (dry weight basis) said interpolymer comprising a polymerized monomer mixture of from about 3 to 8 weight percent acrylic acid, from about 35 to 60 weight percent of a conjugated alkadiene monomer, and the balance up to 100 weight percent comprising at least one material selected from the group consisting of monovinyl aromatic compounds and alkene nitrile compounds, the improvement which comprises the steps of:

A. heating cellulosic substrate sheet members each impregnated with a composition comprising phenol-aldehyde resole resin and carboxylated alkadiene interpolymer such that said individual cellulosic sheet members contain from about 30 to 70 weight percent of said composition for each 100 parts by weight of said cellulosic sheet member, said heating being conducted at a temperature of from about 30° to 180° C. for a time sufficient to advance said composition to an extent such that each such sheet member has a flow of from about 3 to 20 percent.

B. arranging the resulting so-advanced cellulosic sheet member into a desired layered sequence, and C. compressing the resulting sequence while maintaining pressures in the range of from about 50 to 2000 p.s.i. while maintaining a temperature of from about 120° to 180° C. for a time sufficient to substantially completely thermoset said composition and thereby produce a desired laminate construction.

* * * * *